Figure 1:
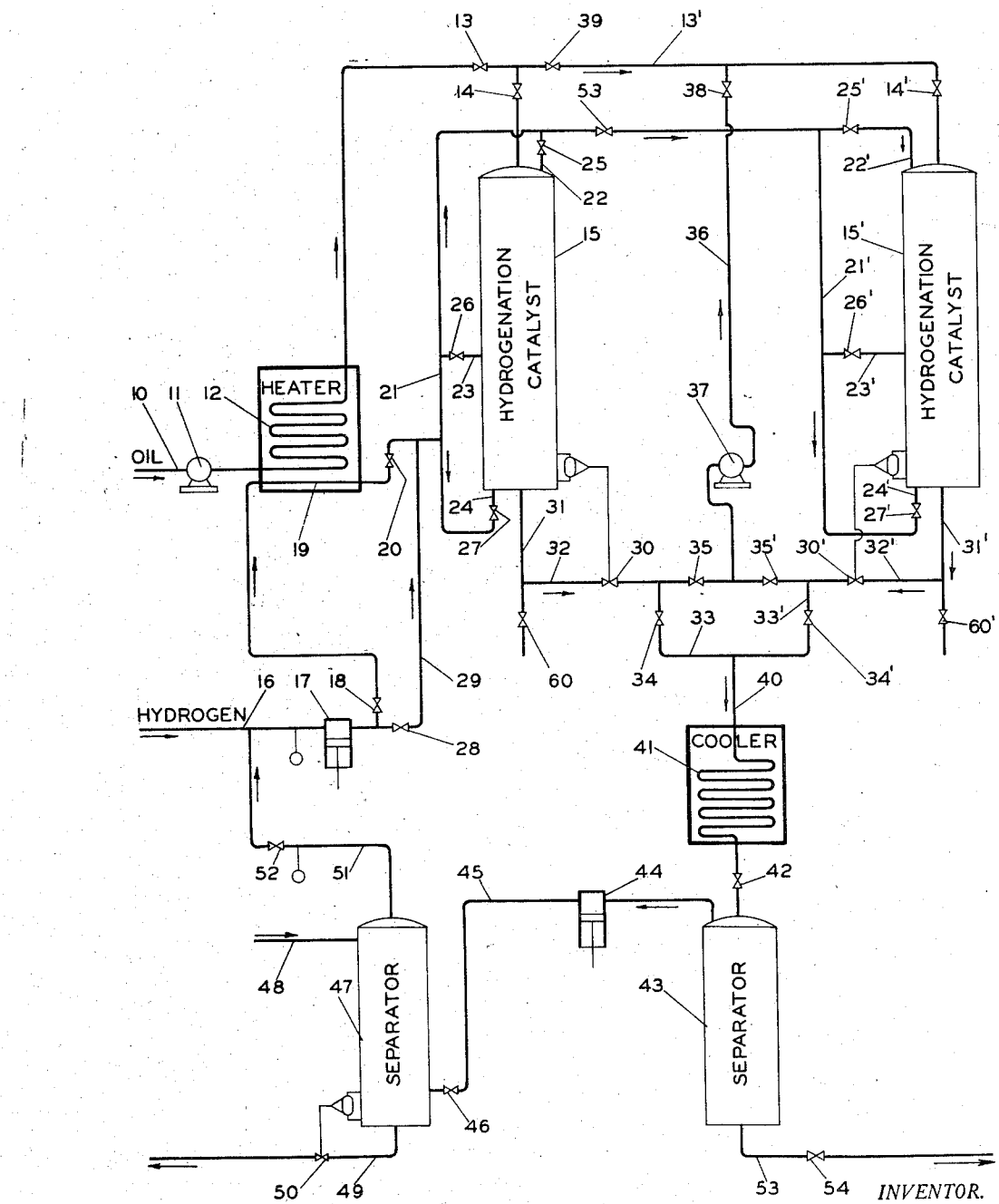

INVENTOR.
HARRY E. DRENNAN

Dec. 26, 1944.   H. E. DRENNAN   2,365,751
PROCESS FOR HYDROGENATING HYDROCARBON OILS
Filed June 7, 1941   2 Sheets-Sheet 2

INVENTOR
HARRY E. DRENNAN
BY
ATTORNEYS

UNITED STATES PATENT OFFICE 2,365,751

PROCESS FOR HYDROGENATING HYDROCARBON OILS

Harry E. Drennan, Bartlesville, Okla., assignor to Phillips Petroleum Company, a corporation of Delaware Application June 7, 1941, Serial No. 397,099

10 Claims. (Cl. 196—78)

The present invention relates to a process for hydrogenation of organic materials such hydrocarbon compounds which are normally liquid or gaseous. More particularly, the invention relates to the hydrogenation of hydrocarbon oils in the boiling range of gasoline to heavy lube oils.

The primary object of this invention is to obtain progressive hydrogenation as a principal reaction.

A further object is to accomplish hydrogenation faster and more completely than known heretofore by certain control of the reaction conditions.

More specifically, hydrogen furnished to the reaction zone under constant pressure is completely consumed by absorption in the oil and saturation of double-bonds whereby the separation and recycle of substantial amounts of gaseous material is avoided.

According to my invention, hydrocarbon oils such as gasoline or lube oils containing unsaturated aliphatic or aromatic constituents may be saturated in a particularly efficient and economic manner by passing the oil in contact with solid hydrogenation catalysts in a static atmosphere of hydrogen maintained under constant pressure in such a manner that the hydrogen has ready access to the oil to be hydrogenated and that only a liquid oil stream is removed from the bottom of the chamber. In this manner hydrogenation can be accomplished at relatively low temperatures and in an atmosphere of substantially pure hydrogen. Small amounts of decomposition products which may be formed are immediately absorbed by the oil by hydrogen pressure and at the low temperatures employed. The flow of the oil through the chamber is so controlled that only a thin film surrounds each catalyst particle to enable rapid penetration of hydrogen under pressure.

The process of hydrogenating hydrocarbon oils in accordance with this invention in a static atmosphere of hydrogen is to be distinguished from those which involve countercurrent hydrogenation, i. e., where a stream of hydrogen passes through the catalyst chamber in an opposite direction to oil flow. Such methods are commonly employed in "destructive" hydrogenation where conditions and duration of treatment are such as to produce substantial splitting and decomposition in addition to hydrogenation. Further, hydrogenating by the countercurrent method necessitates scrubbing and separation of substantial quantities of unreacted hydrogen. By means of the present invention the only hydrogen removed from the hydrogenation tower is that consumed by the unsaturated linkages of the hydrocarbon oils with the exception of a small additional quantity which is absorbed in the oil. Where it is desired to hydrogenate normally gaseous hydrocarbons this may be accomplished by utilizing pressures sufficient to maintain said gaseous compounds in a liquid condition, so that hydrogenation may be effected by contact with the thin liquid films herein referred to.

The degree of hydrogenation of a given weight of oil for a given weight of catalyst per hour is affected by pressure, temperature and rate of flow like other processes, but is affected to a lesser degree by pressure than other processes. One purpose of pressure is to keep the oil saturated with hydrogen. In this process a thin film of oil covers a lump of catalyst and around this is an atmosphere of pure hydrogen which remains so throughout the run. It is obvious that less pressure would be required to cause hydrogen to pass through a thin film of oil to the catalyst than through a thick layer of oil. The rate of hydrogenating reaction depends upon the rate of hydrogen diffusion through the oil to the catalyst and the contacting of the hydrocarbon with the catalyst. The film process described here carried out in a static atmosphere of hydrogen makes it possible to hydrogenate faster at lower pressures than other processes because the hydrogen has only a thin film of oil to diffuse through to reach the catalyst and being free of contaminating gases is rapidly consumed by the unsaturated constituents of the oil. Likewise the flowing film of oil insures thorough contacting of all unsaturated oil with the catalyst and hydrogen. By static atmosphere of hydrogen I means one in which a gaseous atmosphere of hydrogen is maintained in the chamber and is not removed therefrom with the oil stream. That is, only a liquid stream of saturated oil is removed from the chamber. Of course a certain amount of circulation occurs as new hydrogen under pressure enters the chamber to replace that absorbed in saturating the oil.

I have found that 16 to 20 mesh catalyst particles are suitable for use in my process for hydrogenating gasoline and kerosene. For hydrogenation of heavier oils, larger catalyst particles are desirable. Catalysts passing a 10 to 20 mesh screen are suitable for light oils and those passing a 4 to 16 mesh screen are suitable for heavy oils.

My invention possesses an advantage over other known hydrogenation processes in that hydrogenation is faster and more complete.

In the accompanying drawings:

Fig. 1 portrays in diagrammatic outline one form of apparatus suitable for carrying out my invention.

Figure 2:
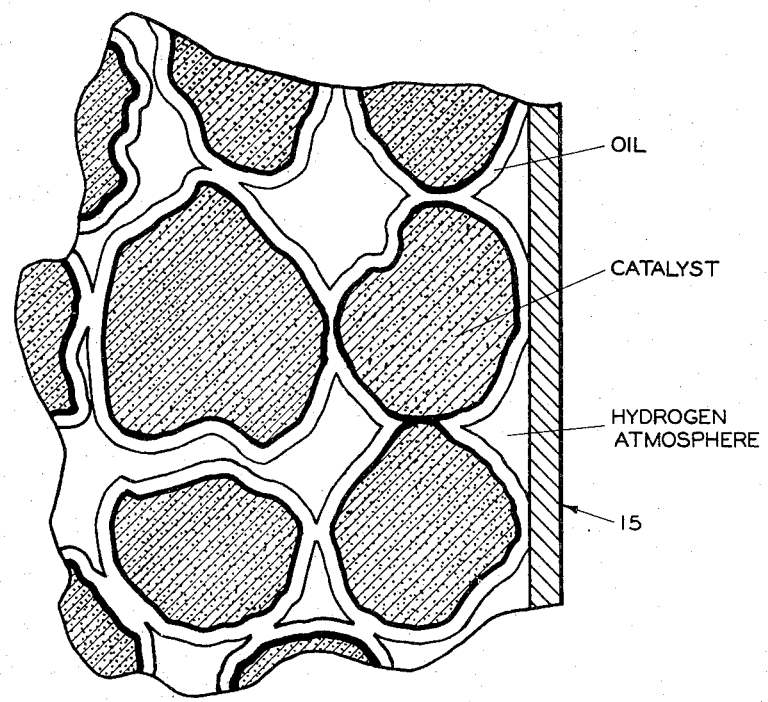

Fig. 2 is a macroscopic sectional view of a portion of the catalyst chamber.

It will be understood that the process of the invention can be carried out in other and different apparatus and that this particular apparatus, although particularly useful in carrying out the invention, is intended but to illustrate the invention.

Referring to Figure 1 of the drawings, oil to be hydrogenated, which may be any organic oil containing unsaturates, particularly hydrocarbon oils, enters the system through pipe 10 and pump 11, wherein the oil is placed under the desired pressure. The oil then flows through heater 12, wherein the temperature is raised to the desired level, and valves 13 and 14 to hydrogenation catalyst tower 15. Hydrogen enters the system through line 16 and compressor 17 and may be passed through valve 18 and line 19 to heater wherein heat may be imparted to the hydrogen, and then through valve 20 to manifold 21. Lines 22, 23 and 24 controlled by valves 25, 26 and 27, respectively, provide for introduction of the hydrogen to the top, side and bottom of the catalyst tower. Instead of passing the hydrogen stream through heater 12, valve 18 may be closed and the hydrogen may be passed through valve 28 and line 29 to manifold 21.

The rate of flow of oil through hydrogenation tower 15 is so controlled that a thin film of oil trickles down over the surface of the catalyst particles without filling the voids or interstices to any substantial extent, which may then be occupied by the hydrogen charged to the tower. By this arrangement in the presence of a static atmosphere of hydrogen, I am able to obtain rapid and complete hydrogenation of the thin oil film. The total pressure in the tower 15 is regulated by the hydrogen pressure and is such that lightweight hydrocarbons and other normally gaseous constituents remain dissolved in the oil, maintaining an atmosphere of substantially pure hydrogen and resulting in an efficient rate of hydrogenation. Fresh hydrogen under pressure is continuously added to the chamber in direct proportion to hydrogen consumed by the oil. The temperature maintained in the tower 15 is sufficient for hydrogenation under the other conditions prevailing in the tower, such as pressure and time of contact, but is maintained below the critical temperature of the oil undergoing hydrogenation and preferably at such a point to prevent substantial splitting or cracking. A small portion of the bottom of tower 15 may contain a pool of oil, but the liquid level in the tower is controlled by the liquid-level-controlled valve 30. Hydrogenated oil leaves the tower 15 through line 31 and may be passed out of the system through valve 60. It is generally desirable, however, to pass the oil through line 32 controlled by valve 30 to line 33 controlled by valve 34.

From line 33 the oil is generally passed through line 40 to cooler 41 and then through valve 42 to separator 43. In separator 43, hydrogen, together with any hydrocarbon vapors, is removed by compressor 44 through line 45 and valve 46 to separator 47 wherein hydrogen is separated from the hydrocarbon vapors. This may be accomplished in any known manner, preferably by an oil wash, introduced through line 48. The enriched oil then leaves through line 49 and valve 50. The remaining hydrogen, freed from hydrocarbon vapors, may then be passed through line 51 and valve 52 to the suction side of compressor 17 where it is mixed with the hydrogen charged to the system. Hydrogenated oil separated in 43 may be removed from the system through line 53 and valve 54.

It is usually more difficult to hydrogenate heavy materials such as lube oils than lighter materials, and longer contact times may be required. These may be obtained by regulating the length of the hydrogenation tower 15 or by passing the oil through a series of towers. Accordingly, I have illustrated an additional catalyst tower 15' which may be connected to tower 15 either in series or in parallel. If connected in parallel, valve 39 will be opened, thus allowing a portion of the oil to pass through line 13' and valve 14' to the tower 15'. Hydrogen may be supplied to this tower by opening valve 53 and admitting hydrogen to manifold 21'. Valves 25', 26' and 27' controlling lines 22', 23' and 24' will be opened. Hydrogenated oil will be withdrawn through lines 31' and 32', valve 30', line 33' and valve 34' to line 40 or optionally from the system through valve 60'. When operating in series, valve 35 will be opened and valves 34 and 35' will be closed, thus diverting the oil from tower 15 through pump 37, line 36 and valve 38 to tower 15', valve 39 being closed.

I am aware that hydrogenation processes are known in which oil is passed together with hydrogen over a hydrogenation catalyst contained in a tower under hydrogenating conditions. As far as I am aware, however, no one has ever accomplished continuous hydrogenation of hydrocarbon oils by passage through a static atmosphere of pure hydrogen while filmed over the hydrogenation catalyst in thin films for maximum hydrogen-oil contact.

The conditions in tower 15 may vary depending on the oil to be hydrogenated and the activity of the catalyst, as well as the critical temperature of the oil. The range of hydrogenation conditions, however, are well known and suitable operating conditions consistent with the proper application of my invention can be ascertained readily by trial.

Fig. 2 is a greatly enlarged cross-sectional view showing how the downwardly flowing oil undergoing hydrogenation forms a thin readily penetrated film around each individual catalyst granule. The figure is self-explanatory.

The following examples illustrate satisfactory modes of operation under the conditions set forth therein. These examples are for the purpose of illustrating certain specific applications of my invention and are not intended to limit the scope of my invention as set forth in the specification and as claimed hereinafter.

*Example I*

Gasoline containing 18% olefins and 20% aromatics, with a Reid vapor pressure of 35# at 110° F. and end point of 323° F., was passed over a hydrogenation catalyst comprising magnesia and nickel oxide in the ratio of 1:1, screened to pass through a 16 and be retained on a 30 mesh sieve. Hydrogen was introduced to the tower and maintained at a pressure of 2,000 pounds per square inch gauge, and the temperature of the gasoline entering the tower was 400° F. The temperature in the catalyst bed one-third down from the top was 475° F. The ratio of oil feed was one volume of gasoline per hour per two volumes of catalyst. One pass was sufficient to reduce the olefin content to 0%, and the compounds in the hydrogenated gasoline soluble in fuming sulfuric acid amounted to 2%. An Engler distillation of the hydrogenated product indicated very little cracking or splitting of the oil.

*Example II*

Lube oil having a Saybolt viscosity of 67 seconds at 210° F., an initial boiling point of 610° F. and 90% over at 762° F. and 24° A. P. I. gravity was passed over a catalyst comprising 40% nickel oxide and 60% alumina, sized to pass an 8 and be retained on a 16 mesh screen. The oil entering the tower was at a temperature at 550° F. Hydrogen was introduced to the tower and maintained at a pressure of 2,000 pounds per square inch gauge. The temperature in the catalyst bed was 675° F. Rate of flow was maintained at one volume of oil per two volumes of catalyst per hour. Hydrogenation of the oil was practically complete. Before hydrogenation, the oil was a very dark color but the color of the product was 1 N. P. A. with a brilliant green fluorescence.

I claim:

1. A process for hydrogenating a hydrocarbon oil containing unsaturated hydrocarbon constituents which comprises passing said oil through a bed of granular hydrogenation catalyst contained in a chamber in such manner and at such a flow rate that said oil forms thin flowing films around the catalyst granules without filling the voids in the catalyst bed to any substantial extent, maintaining a static atmosphere of hydrogen in said chamber and in said voids of said catalyst bed at a substantially constant superatmospheric pressure, maintaining the oil and hydrogen at a hydrogenating temperature, and removing a liquid stream of oil from said chamber.

2. A process for hydrogenating a hydrocarbon oil containing unsaturated hydrocarbon constituents which comprises passing said oil through a bed of granular hydrogenation catalyst contained in a chamber in such manner and at such a flow rate that said oil forms thin flowing films around the catalyst granules without filling the voids in the catalyst bed to any substantial extent, maintaining a static atmosphere in said chamber and in said voids of said catalyst bed at a substantially constant superatmospheric pressure which is sufficient to maintain normally gaseous constituents of said oil in solution, maintaining the oil and hydrogen at a hydrogenating temperature, and removing a liquid stream of oil from said chamber.

3. A process for hydrogenating a hydrocarbon oil containing unsaturated hydrocarbon constituents which comprises passing said oil through a bed of granular hydrogenation catalyst contained in a chamber in such manner and at such a flow rate that said oil forms thin flowing films around the catalyst granules without filling the voids in the catalyst bed to any substantial extent, maintaining a static atmosphere of hydrogen in said chamber and in said voids of said catalyst bed at a substantially constant superatmospheric pressure which is sufficient to maintain normally gaseous constituents of said oil in solution, maintaining the oil and hydrogen at a hydrogenating temperature that is below the critical temperature of the oil and below the temperature at which any substantial cracking or splitting of the oil occurs, and removing a liquid stream of oil from said chamber.

4. A process for hydrogenating a hydrocarbon oil containing unsaturated hydrocarbon constituents which comprises passing said oil through a bed of granular hydrogenation catalyst, the individual granules of which are of such size with reference to the viscosity of the oil that the voids formed in the catalyst bed provide for circulation of hydrogen around the individual catalyst granules when covered with a thin film of the oil, at such a flow rate that only a thin film of oil surrounds the individual catalyst granules and the voids in the catalyst bed are not filled to any substantial extent, maintaining a static atmosphere of hydrogen throughout and surrounding the catalyst bed at a substantially constant superatmospheric pressure, maintaining the oil and hydrogen at a hydrogenating temperature that is below the critical temperature of the oil and below the temperature at which any substantial cracking or splitting of the oil occurs, and removing a liquid stream of oil from the catalyst bed.

5. A process for hydrogenating a hydrocarbon oil containing unsaturated hydrocarbon constituents which comprises passing said oil through a bed of granular hydrogenation catalyst contained in a chamber at such a flow rate that only thin films of said oil cover the individual granules and without filling the voids in the catalyst bed to any substantial extent, maintaining a static atmosphere of hydrogen in said chamber and in said voids of said catalyst bed at a pressure sufficient to promote progressive hydrogenation within said oil films and maintain normally gaseous constituents of said oil in solution, continuously adding hydrogen to said chamber in direct proportion to hydrogen consumed by said oil, maintaining the oil and hydrogen at a hydrogenating temperature, and removing a liquid stream of oil from said chamber.

6. A process for hydrogenating a hydrocarbon oil which comprises passing such oil through a bed of a particulate hydrogenation catalyst, the individual particles of which have a size within the range from approximately 4 to approximately 20 mesh, contained in a chamber at such a flow rate that only thin films of said oil cover the individual particles, maintaining a static atmosphere of hydrogen in said chamber at sufficient pressure to promote progressive hydrogenation within said oil films and maintain normally gaseous constituents of said oil in solution, continuously adding hydrogen under constant pressure to said chamber in direct proportion to hydrogen consumed by said oil, maintaining the oil and hydrogen at a hydrogenating temperature, and removing a liquid stream of oil from said chamber.

7. A process as defined in claim 6 in which the bed of particulate hydrogenation catalyst consists of a composite catalyst comprising magnesia and nickel oxide in the ratio of 1:1, the individual particles of which pass through a 16-mesh and are retained on a 30-mesh sieve.

8. A process as defined in claim 6 in which the bed of particulate hydrogenation catalyst is composed of a composite catalyst comprising 40% nickel oxide and 60% alumina, the individual particles of which pass through an 8-mesh and are retained on a 16-mesh screen.

9. A continuous process for non-destructively hydrogenating a hydrocarbon material containing unsaturated hydrocarbon constituents which comprises arranging a granular solid hydrogenation catalyst in a bed in a closed hydrogenation zone, the catalyst granules forming a substantial volume of voids therebetween so that the resulting bed is pervious, continuously passing the hydrocarbon material in liquid phase downwardly through said catalyst bed in such manner that it forms only thin downwardly flowing films around each of the catalyst granules without filling the voids in the catalyst to any substantial extent, continuously maintaining throughout the hydrogenation zone a static atmosphere of substantially pure hydrogen around each filmed catalyst granule and under sufficient pressure to keep the hydrocarbon films physically saturated with hydrogen and to thereby cause hydrogen to diffuse through said films into contact with the catalyst, and to cause any normally gaseous decomposition products which may be formed to be absorbed by said films, continuously removing from the bottom of the catalyst bed at a rate corresponding to the infeed rate a liquid hydrocarbon stream containing in solution a small amount of dissolved hydrogen, said dissolved hydrogen being the only free hydrogen removed from the hydrogenation zone, supplying fresh hydrogen to said zone in amount only sufficient to maintain said pressure substantially constant throughout and to replace that consumed in hydrogenating said hydrocarbon material and dissolved in said liquid stream, and maintaining the temperature below the critical temperature of the hydrocarbon material being hydrogenated and at a point such as to prevent substantial splitting or cracking of said material.

10. The process of claim 9 wherein said catalyst comprises nickel oxide.

HARRY E. DRENNAN.